G. A. SMITH.
SOLID ARTIFICIAL FUEL BURNER.
APPLICATION FILED FEB. 28, 1921.
1,403,132.
Patented Jan. 10, 1922.
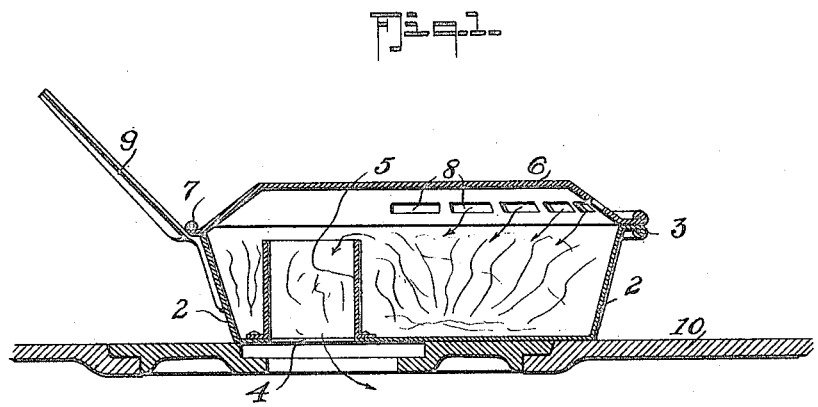
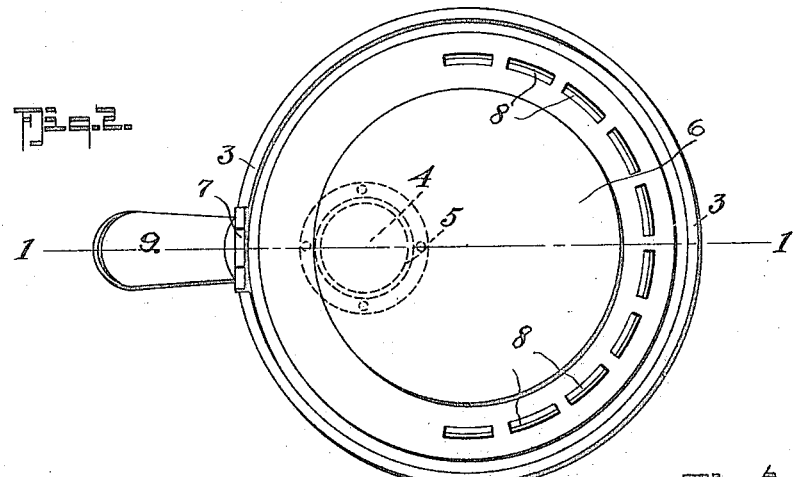
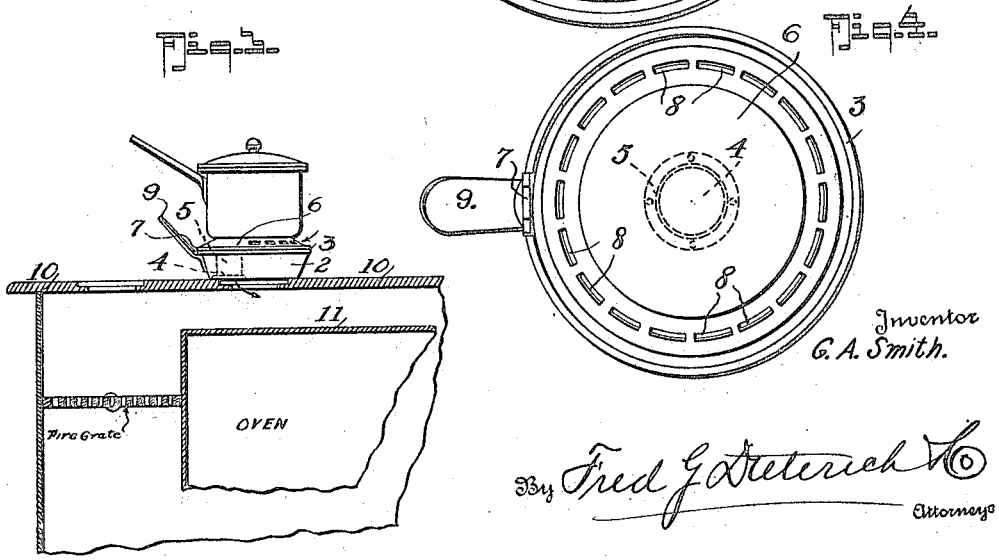
Inventor
G. A. Smith.
By Fred G. Dieterich
Attorneys

UNITED STATES PATENT OFFICE.

GEORGE A. SMITH, OF VICTORIA, BRITISH COLUMBIA, CANADA.

SOLID ARTIFICIAL FUEL BURNER.

1,403,132.          Specification of Letters Patent.      Patented Jan. 10, 1922.

Application filed February 28, 1921. Serial No. 448,509.

*To all whom it may concern:*

Be it known that I, GEORGE A. SMITH, a citizen of the Dominion of Canada, residing at Victoria, in the Province of British Columbia, Canada, have invented certain new and useful Improvements in Solid Artificial Fuel Burners, of which the following is a specification.

This invention relates to an artificial fuel holder and means for supporting a cooking vessel thereover, designed for application over an aperture in the top plate of an ordinary cooking stove, or elsewhere where a draught may be maintained.

The invention is fully described in the following specification, reference being made to the drawings by which it is accompanied, wherein—

Fig. 1 is a vertical section of the fuel holder on the line 1—1 in Fig. 2 showing application of the device over the top plate aperture of a stove.

Fig. 2 is a plan of the same.

Fig. 3 illustrates its application to a stove.

Fig. 4 shows a modification in plan.

The device comprises a fuel supporting pan 2 stamped from thin sheet metal or the like and adapted to be placed over the circular aperture in the top plate 10 of a stove, preferably over the flue between the top plate 10 and the roof 11 of the oven, so as to be in the line of draught between the fire grate and the stove-pipe connection. The upper edge of this pan 2 is outwardly flanged as at 3, to reinforce its edge and form a seat for its cover to be described later.

The bottom of this pan 2 is apertured as at 4, which aperture is either eccentric with the pan, as in Figs. 1, 2 and 3, or concentric therewith, as in Fig. 4, and upwardly projecting from the edge of this aperture is a short tubular duct 5.

The lower edge of an upwardly dished cover 6 seats on the flanged edge 3 of the pan and is hinged at 7 thereto. Around the slope of the cover 6 a series of apertures 8 is pierced. Where the aperture 4 is eccentric these apertures 8 only extend round that portion opposite 8, as shown in Fig. 2, but where, as in Fig. 4, the aperture 4 is concentric with the pan the air inlet apertures 8 may extend around the entire circle.

The pan 2 is provided with a handle 9 by which it may be placed on or removed from the stove plate 10.

In use, the pan 2 is placed over an aperture of the top plate 10 of the stove or elsewhere where it will be in the line of draught between a fire grate and a chimney, and the artificial fuel is placed in the pan and ignited: The cover 6 is then lowered and the cooking vessel is seated on the cover. Air enters at 8 to supply the requirements of combustion of the fuel and the products of combustion pass over the upper edge of 5 and through the aperture 4 to the draught flue.

The cover 6 on which the cooking vessel is placed receives the greater part of the heat from the fuel combustion as the products of that combustion are induced by the draught of the stove to pass over the upper edge of 5.

Although the pan 2 is described and illustrated as made of sheet metal, it may be made of any heat non-conducting material, such as earthenware, that will stand the relatively moderate heat to which it is subjected, or the sheet metal pan may be lined with asbestos board or other heat non-conducting material.

Having now particularly described my invention, I hereby declare that what I claim as new and desire to be protected in by Letters Patent, is:

1. An artificial fuel burner, comprising a circular pan adapted to seat over an aperture in the top plate of a stove or the like, said pan having an aperture in the bottom from the edge of which aperture a flue upwardly projects to adjacent the upper edge of the pan, means for supporting a cooking vessel over the pan, and means for admitting air to the pan around the edge of the cooking vessel supported thereon.

2. An artificial fuel burner, comprising a circular pan adapted to seat over an aperture in the top plate of a stove or the like, said pan having an aperture in the bottom from the edge of which a cylindrical flue projects to adjacent the upper edge of the pan, a cover adapted to rest on the upper edge of the pan and upwardly project therefrom, and air admission apertures around the raised portion of the cover.

3. An artificial fuel burner, comprising a circular pan adapted to seat over an aperture in the top plate of a stove or the like, said pan having an aperture in the bottom from the edge of which aperture a flue projects to adjacent the upper edge of the pan, a cover hinged at one side to the upper side of the pan and adapted to seat thereon, the central portion of said cover raised above its edge, and means adjacent the edge of the cover for admitting air to the pan.

In testimony whereof I affix my signature.

GEORGE A. SMITH.